United States Patent [19]
Sylvan et al.

[11] Patent Number: 5,325,765
[45] Date of Patent: Jul. 5, 1994

[54] BEVERAGE FILTER CARTRIDGE

[75] Inventors: John E. Sylvan, Brookline; Peter B. Dragone, Concord, both of Mass.

[73] Assignee: Keurig, Inc., Waltham, Mass.

[21] Appl. No.: 945,746

[22] Filed: Sep. 16, 1992

[51] Int. Cl.5 .................. A47J 31/24; A47J 31/14
[52] U.S. Cl. .................. 99/295; 99/302 R; 99/317; 426/77; 426/433; 426/435
[58] Field of Search ............ 426/77, 82, 473, 477, 426/479, 482, 435, 112, 433; 99/279, 295, 300, 302 R, 302 P, 304, 306, 307, 316, 317, 321

[56] References Cited

U.S. PATENT DOCUMENTS

| | | |
|---|---|---|
| 240,402 | 4/1881 | Gee . |
| 346,278 | 7/1886 | Halstead . |
| 370,141 | 9/1887 | Hobbs . |
| 845,968 | 3/1907 | Murray . |
| 1,168,544 | 1/1916 | Newlin . |
| 1,302,483 | 4/1919 | Vierling . |
| 2,997,940 | 8/1961 | Pecoraro et al. . |
| 3,199,682 | 8/1965 | Scholtz . |
| 3,260,190 | 7/1966 | Levinson ............ 99/295 |
| 3,403,617 | 10/1968 | Lampe ............... 99/295 |
| 3,579,351 | 5/1971 | Wege et al. ......... 426/82 |
| 3,615,708 | 10/1971 | Abile-Gal . |
| 3,754,463 | 8/1973 | Vernooy ............. 99/302 |
| 3,971,305 | 7/1976 | Daswick ............. 426/77 |
| 4,204,966 | 5/1980 | Morgan, Jr. . |
| 4,321,139 | 3/1982 | Auclair . |
| 4,417,504 | 11/1983 | Yamamoto . |
| 4,584,101 | 4/1986 | Kataoka ............. 426/82 |
| 4,859,337 | 8/1989 | Woltermann . |
| 4,981,588 | 1/1991 | Poulallion .......... 426/77 |

*Primary Examiner*—Robert W. Jenkins
*Attorney, Agent, or Firm*—Samuels, Gauthier & Stevens

[57] ABSTRACT

A beverage filter cartridge includes an impermeable pierceable base having a predetermined shape and an opening at one end; a self-supporting wettable filter element disposed in the base sealingly engages with the opening in the base and has a form different and smaller than the predetermined shape of the base so that the filter element diverges from the base and divides the base into two sealed chambers, a first chamber for storing an extract of the beverage to be made, and a second empty chamber for accessing the beverage after the beverage outflow from the filter has been made by combining a liquid with the extract; and an impermeable pierceable cover sealingly engaged with the opening in the base to form an impermeable cartridge.

16 Claims, 4 Drawing Sheets

BEVERAGE FILTER CARTRIDGE

FIELD OF INVENTION

This invention relates to a beverage filter cartridge, and more particularly to such a beverage filter cartridge with a self-supporting wettable filter that provides an enlarged filter outflow chamber that enhances beverage flow and protects the filter against damage during penetration in an automatic brewing machine.

BACKGROUND OF INVENTION

There are a number of schemes for providing devices for making a single beverage server, such as a cup of coffee or tea. In one approach a disposable container fits on top of a cup and has a compartment for receiving a beverage extract such as coffee with a large reservoir on top into which a person must pour boiling water. These devices are disposable but expensive though, and the coffee is exposed to the air where it can easily get stale or contaminated. And they are not generally suitable for automatic coffee making or other beverage machines. Since the flow rate of beverage is generally slow, these devices are typically large relative to the volume of beverage dispensed. In addition, since these devices are designed to be used upright only the bottom area is available for filtration flow and this contributes to the slowness of the filtration process. Attempts to overcome these shortcomings have met with indifferent success. In one construction a filter is provided in a sealed receptacle but included intermediate the receptacle and filter is a support member which functions to support the filter. When the filter is wetted it sags and conforms with the support member which has a hole in it to release the filtered beverage but otherwise blocks the output of the filter. Such a filter design used in an application where water is injected under pressure would provide low flow rates.

SUMMARY OF INVENTION

It is therefore an object of this invention to provide an improved beverage filter cartridge.

It is a further object of this invention to provide such an improved beverage filter cartridge which is small and compact yet has a high flow rate.

It is a further object of this invention to provide such an improved beverage filter cartridge which is simple and has very few parts so it can be disposed of after a single use.

It is a further object of this invention to provide such an improved beverage filter cartridge whose filter is self supporting and does not collapse against the container even when wetted.

It is a further object of this invention to provide such an improved beverage filter cartridge which requires only a small filter element.

It is a further object of this invention to provide such an improved beverage filter cartridge which is not restricted in use to a single orientation.

It is a further object of this invention to provide such an improved beverage filter cartridge which is totally sealed for freshness and against contamination.

It is a further object of this invention to provide such an improved beverage filter cartridge which can be pierced for input and output flow without puncturing the filter.

It is a further object of this invention to provide such an improved beverage filter cartridge which maintains its integrity and that of the filter even when the cartridge is dually penetrated for inflow and outflow.

It is a further object of this invention to provide such an improved beverage filter cartridge which even when the filter is wetted maintains a substantial volume between the filter and cartridge for safely receiving a penetrator and for enhancing filter flow-through.

This invention features a beverage filter cartridge including an impermeable pierceable base having a predetermined shape and an opening at one end. There is a self-supporting wettable filter element disposed in the base sealingly engaged with the opening of the base and having a form different and smaller than the predetermined shape of the base so that the filter element diverges from the base and divides the base into two sealed chambers. There is a first chamber for storing an extract of the beverage to be made and a second chamber for accessing the beverage outflow from the filter after the beverage has been made by combining a liquid with the extract. There is an impermeable pierceable cover sealingly engaged with the opening in the base to form a gas impermeable cartridge.

In a preferred embodiment the cover may be domed convexly outward. The opening of the base may include a flange and the cover may include a mating flange which establish the sealing engagement of the base and cover. The domed cover convexity may extend outwardly beyond the opening of the base. The filter and the base may both generally be truncated, non-congruent cones. The filter may be generally a cone shape and the base may be generally a truncated cone shape. The filter may be a triangular prism with a circular base and the base may be truncated cone shape. The base may be made of polystyrene, ethylene vinyl alcohol, and polyethylene. The cover may be made of the same material. The filter may be made of a lightweight, two-phase heat-sealable paper of cellulosic synthetic fibers. These synthetic fibers may be PVC or polypropylene. The filter element may terminate in a reduced apex portion spaced from the bottom of the base to define an enlarged second chamber for receiving the piercing element in the lower portion of the base without subjecting the filter element to penetration.

DISCLOSURE OF PREFERRED EMBODIMENT

Other objects, features and advantages will occur to those skilled in the art from the following description of a preferred embodiment and the accompanying drawings, in which.

The beverage filter cartridge of this invention may be accomplished using an impermeable pierceable base having a predetermined shape such as a truncated cone with an opening at one end. The opening typically is round and has a rim or lip or flange at the opening, extending radially outwardly. The base may be made of a combination of polystyrene, ethylene vinyl alcohol and polyethylene. There is a self-supporting wettable filter element disposed in the base and sealingly engaged with the lip or rim of the base. The filter element may be made of a lightweight, two-phase heat sealable paper of cellulosic and synthetic fibers. The synthetic fibers may be PVC or polypropylene so that they are compatible with the material of the base and are therefore easily sealed to the base using heat, ultrasonic energy or microwave energy. In addition, the material of the filter is such that the filter is totally self-supporting. Even when it is wetted, it will not collapse or sag against the inner walls of the base. The filter can have the shape of a cone, a truncated cone, or a triangular prism which fans out and blends into a circular base. The filter is smaller than and non-congruent with the base so that it diverges and divides the base into two sealed chambers. In the first chamber there is stored the extract of the beverage such as coffee that is to be made, and the second chamber has a substantial empty volume for accessing the beverage outflow from the filter after the beverage has been made by combining liquid with the extract. This enlarged volume of the second chamber enhances the filter flow since the filter is not in contact or in any way blocked by the walls of the base, and water can flow through the entire filter surface. In addition it provides ample room so that a penetrator which perforates the base will not injure or sacrifice the integrity of the filter itself. There is an impermeable pierceable cover which is sealingly engaged with the opening in the base to form a complete impermeable cartridge. The cover, which is made of the same material, also has a flange or rim or lip which extends radially outwardly and engages the mating rim on the base. The cover is typically domed convexly outwardly, so that for example when coffee is piled in the cartridge in the form of a typically rounded mound, the placement of the cover does not displace the coffee powder so that it leaks or sprays outwardly and degrades the quality of the seal along the flanges. In addition, the convex shape provides an increased rigidity for the cover so that it provides resistance to produce a clean penetration when a needle or other penetrator is inserted through it into the first chamber. It is through this penetration that the hot water is delivered to the coffee. The penetration in the base provides the exit for the liquid coffee to be dispensed.

Figure 1:
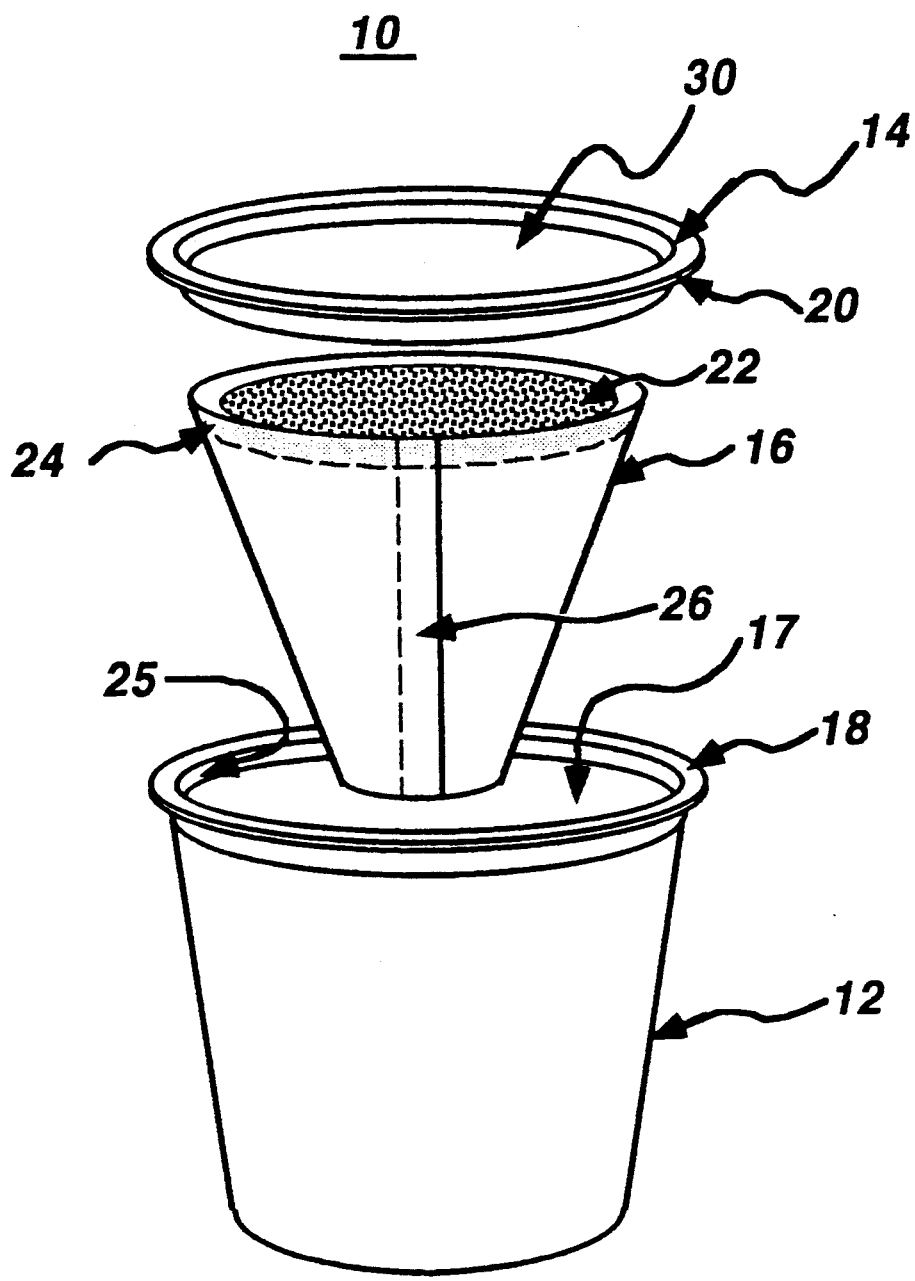
FIG. 1 is a three-dimensional exploded view of a beverage filter cartridge according to this invention.

There is shown in FIG. 1 a cartridge 10 according to this invention which includes base 12, cover 14, and filter 16. Base 12 includes opening 17 and outwardly facing flange rim or lip 18 similar to the rim 20 on cover 14. Base 12 has the shape of an inverted truncated cone, as does filter 16, which contains coffee powder 22.

Figure 2:
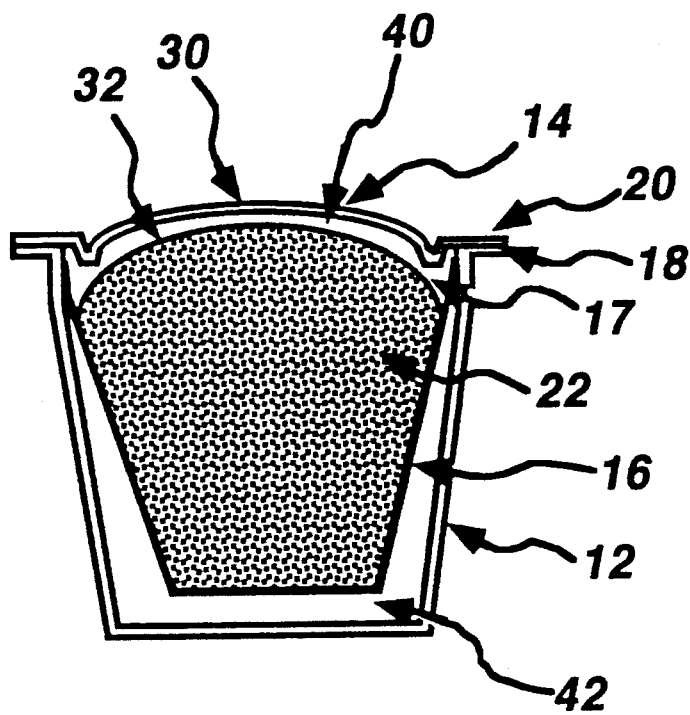
FIG. 2 is a side sectional elevational view of the cartridge of FIG. 1.
Figure 3A:
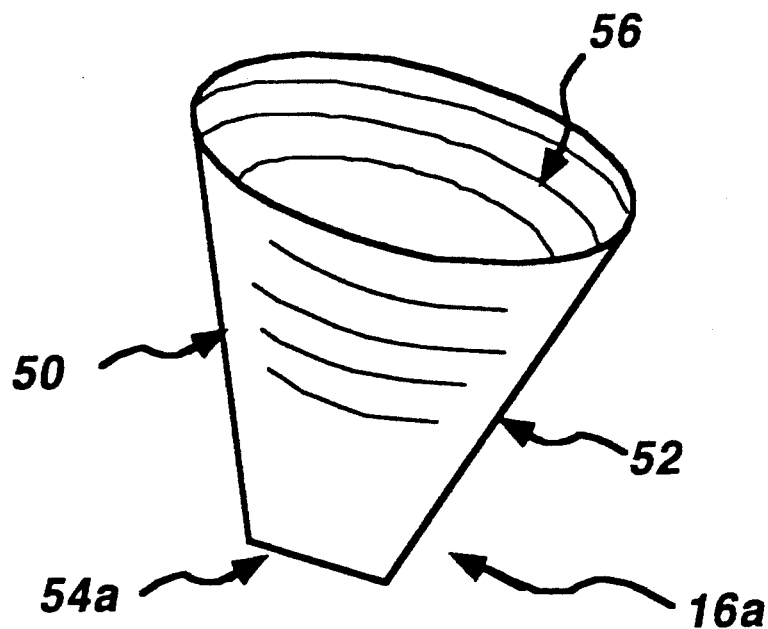
FIG. 3A is a three-dimensional view of the filter of FIGS. 1 and 2.
Figure 3B:
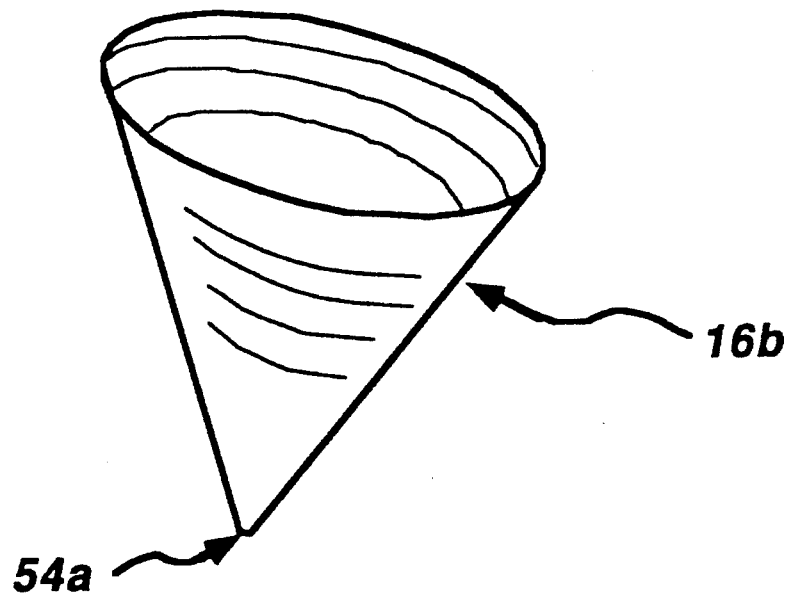
FIG. 3B is a view similar to FIG. 3A of an alternative conical shaped filter.

Filter 16 can be drawn or formed as a monolithic structure or may be made in a pattern and then rolled and sealed such as at seam 26. Filter 16 is sealingly engaged at its edge 24 with the adjacent surface 25 of base 12. Cover 14 may have a domed portion 30, as seen more clearly in FIG. 2, which extends outwardly beyond opening 17 and rims 18 and 20. This domed shape 30 not only nicely accommodates the rounded top 32 of the coffee 22 in filter 16, but it also provides an extra measure of rigidity for cover 14 so that it can present a firm opposition resulting in a clean penetration from a needle or other penetrator in an automatic brewing machine or other type of machine. The seal formed between filter 16 and base 12 creates two chambers, chamber 40 in which coffee 22 is stored, and chamber 42 which receives the outflow from filter 16. Chamber 42 is produced by the fact that tiller 16 is smaller and divergent, although often similar in shape to base 12. This larger chamber 42 enhances the outflow from filter 16 and also provides ample room for a penetrator to penetrate base 12 without puncturing filter 16. Although filter 16 is shown as a truncated conical structure, this is not a necessary limitation of the invention, as it might as well be what might be generally called a triangular prism, filter 16a, FIG. 3A, having sloping sides 50, 52, a reduced apex 54, and a generally circular base 56. In an alternative form, filter 16b, FIG. 3B, may take the form of a cone whose reduced apex 54b is simply the tip of the cone. In either case the apices 54, 54b would be spaced from the bottom of base 12.

Figure 4:
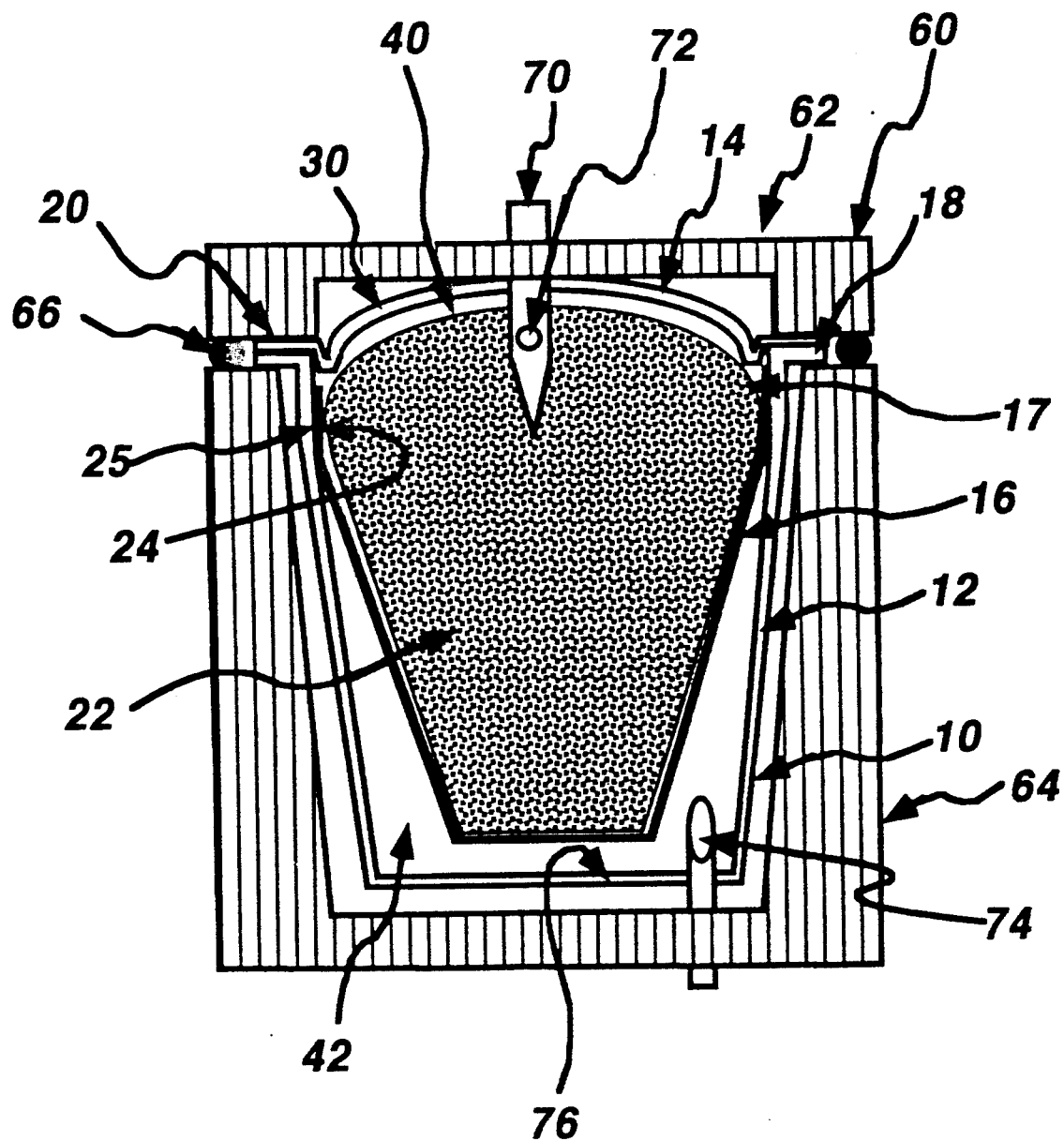
FIG. 4 is a side elevational view similar to that shown in FIG. 2 of the cartridge installed in a portion of a machine which pierces both the top and the bottom chambers of the cartridge.

Cartridge 10 is well adapted for use in an automatic machine such as a coffee brewing machine where it will be delivered to and gripped in a housing 60, FIG. 4, which has an upper part 62 and a lower part 64 sealingly engaged at seal 66 by a portion of the machine not shown. Part 62 includes a penetrator or needle 70 which penetrates domed cover 14 to provide pressurized hot water through hole 72 to coffee 22 in filter 16. A second penetrator or needle 74 is pushed through the bottom 76 of base 12 to receive the outflow of the coffee beverage and dispense it to a cup or container.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A beverage brewing apparatus comprising:
   a housing having a first component defining a brewing chamber with an access opening, and a second component which may be opened to afford access to said brewing chamber via said access opening, and which may be closed to coact in sealing engagement with said first component to close said access opening;
   an impermeable piercable cartridge removably received in said brewing chamber via said access opening, said cartridge being internally subdivided by a filter element into first and second cartridge chambers;
   a beverage extract contained in said first cartridge chamber;
   liquid inlet and outlet means extending through said housing into said brewing chamber to penetrate through said cartridge into communication respectively with said first and second cartridge chambers; and
   means for injecting liquid into said first cartridge chamber via said inlet means for combination with said beverage extract to produce a liquid beverage, said filter element being adapted to accommodate passage therethrough of said beverage into said second cartridge chamber for outflow through said outlet means.

2. The beverage brewing apparatus of claim 1 wherein said cartridge comprises a base having a predetermined shape and an open end, said filter element being disposed in said base, sealingly engaged with said open end and having a form different and smaller than said predetermined shape of said base so that said filter element diverges with respect to said base to divide said base into first and second cartridge chambers; and a cover sealingly engaged with said open end.

3. The beverage brewing apparatus of claim 2 wherein said cover is domed convexly outwardly.

4. The beverage brewing apparatus of claim 2 wherein said base and cover include mating flanges coacting in sealing engagement to define an exterior rim surrounding said cartridge.

5. The beverage brewing apparatus of claim 4 wherein said rim is held between the first and second housing components when said second housing component is closed.

6. The beverage brewing apparatus of claim 2 wherein said inlet and said outlet means penetrate said cartridge when said second component is closed.

7. The beverage brewing apparatus of claim 2 wherein said filter element and said base are both generally truncated non-congruent cones.

8. The beverage brewing apparatus of claim 2 wherein said filter element is generally a cone shape and said base is generally a truncated cone shape.

9. The beverage brewing apparatus of claim 2 wherein said filter element is a triangular prism with a circular base and said base is a truncated cone shape.

10. The beverage brewing apparatus of claim 2 wherein said base is made of polystyrene, ethylene vinyl alcohol and polyethylene.

11. The beverage brewing apparatus of claim 2 wherein said cover is made of polystyrene, ethylene vinyl alcohol and polyethylene.

12. The beverage brewing apparatus of claim 2 wherein said filter element is made of lightweight two phase heat sealable paper of cellulosic and synthetic fibers.

13. The beverage brewing apparatus of claim 12 wherein said synthetic fibers are PVC or polypropylene.

14. The beverage brewing apparatus of claim 2 wherein filter element terminates in a reduced apex portion spaced from the bottom of said base to accommodate penetration of said outlet means into the lower portion of said base without subjecting said filter element to penetration.

15. The beverage brewing apparatus of claim 1 wherein said liquid inlet means protrudes through said second housing component, and said liquid outlet means protrudes through said first housing component.

16. The beverage brewing apparatus of claim 1 wherein said filter element is arranged within said cartridge to avoid penetration by said inlet and outlet means.

* * * * *